3,657,160
NON-STAINING RECLAIMS

Allen E. Crepeau, Oxford, Conn., assignor to
Uniroyal, Inc., New York, N.Y.
No Drawing. Filed May 4, 1970, Ser. No. 34,620
Int. Cl. C08f 47/24
U.S. Cl. 260—2.3                                5 Claims

ABSTRACT OF THE DISCLOSURE

This invention deals with a process for reclaiming scrap vulcanized rubber, and particularly with the improvement which comprises heating the scrap at reclaiming temperatures in the presence of an aldehyde or aldehyde donor and in the presence of a resorcinol material.

---

This invention relates to improvements in the reclaiming of scrap vulcanized rubber, and more particularly to the preparation of reclaim having improved non-staining properties.

The Mankowich et al. U.S. Pat. No. 2,871,205 describes the reclaiming of scrap vulcanized rubber in the presence of certain aldehydes, preferably formaldehyde, which form non-staining reaction products with the normally staining ingredients of the reclaim, to produce reclaim having improved non-staining properties. In the practice of the present invention, the process of Mankowich et al. is modified to give reclaim having still further improved non-staining properties.

According to the present invention, scrap vulcanized rubber is reclaimed by heating it in the presence of any of certain aldehydes, as in U.S. Patent No. 2,871,205, and in the presence of added resorcinol, phloroglucinol, or various resorcinol condensates.

Conventional rubber reclaiming processes, such as the digester process, the heater process, and so-called mechanical process may be used with the present invention. In the usual digester process, a charge of ground vulcanized rubber scrap and about 100 to 300 parts by weight of water per 100 parts of scrap, to which a cellulose-destroying chemical, such as caustic soda, calcium chloride, or zinc chloride may be added, is heated under pressure in a closed, steam-jacketed container equipped with an agitator, until the fiber in the scrap is partially or wholly destroyed, and the rubber has become plasticized. The charge is then washed free from any such added chemicals, and is dried and milled. In the usual heater process, ground vulcanized rubber scrap, in a dried, or somewhat moistened condition (about 1 to 10 parts by weight of water per 100 parts of scrap), is heated with live steam under pressure in trays or pans in an autoclave until the rubber becomes plasticized. The plasticized scrap is then removed from the heater and milled. The mechanical process is essentially a mechanical working of dry vulcanized rubber scrap at elevated temperature, which may conveniently be performed in a Banbury mill or in a "Reclaimator" machine. The reclaiming in any of the above types of process takes place at the usual reclaiming temperatures of at least 300° F. In general, the digester and heater reclaiming take place at temperatures from about 300° F. to about 420° F., and the temperature in the mechanical process may go higher—to about 550° F. In these processes, the ground scrap may be mixed initially with conventional cellulose-destroying or defiberizing agents, softening oils, plasticizers or chemical reclaiming agents, which of course should be non-staining.

In carrying out the present invention, the vulcanized rubber scrap, which may be of natural or synthetic rubbers, or mixtures thereof, is comminuted and then reclaimed by treatment at reclaiming temperatures of 300° F. to 550° F., generally, and preferably at 300° F. to 420° F. in digester and heater processes, in the presence of added aldehyde and added resorcinol or related substance incorporated in the batch either initially or at any times before completion of the heating, and in any order. The present invention is particularly adapted to digester reclaiming.

The aldehyde may be formaldehyde, or a formaldehyde-yielding substance, or formaldehyde donor such as paraformaldehyde, methylal, trimethylolphenol, and trimethylolacetaldehyde, or chloral—formaldehyde being preferred.

The aldehyde substance and the resorcinol or analogous substance are added to the reclaiming batch in effective amounts. The minimum effective amount of aldehyde is about 0.2% of the weight of scrap taken. The minimum effective amount of the resorcinol or analogous material is about 0.001%. As much as 10% of aldehyde and 2% of resorcinol may be used, but the usual amounts are from 2% to 5½% of aldehyde and from 0.01% to 0.5% of resorcinol. No material advantage is seen to come from the use of high amounts of the chemicals. Care is taken to insure that the amount of available aldehyde present is equal to at least one-half the amount of resorcinol present (on a molar basis).

The synthetic rubbers to which the invention is applicable include any of the known sulfur-vulcanizable polymer and copolymer rubbers derived from alkadienes.

The following examples illustrate the invention. All parts and percentages of materials referred to herein are by weight.

EXAMPLE 1

Each of three different samples, A, B, and C (100 parts each) of cracked whole tire fiber-containing vulcanized scrap, in which the rubber content was about 16% natural rubber and 26% SBR, was mixed with 22 parts of non-staining rubber softening oils (terpenes and mineral spirits), 8 parts of non-staining plasticizer (tall oil pitch), 0.8 part of calcium chloride, and 200 parts of water. The charges were loaded into jacketed, agitated autoclaves and heated four hours at a pressure of about 200 pounds per square inch (375° F.). Then 4 parts of 37% aqueous formaldehyde was added to each of charges B and C, and the heating at 375° F. of the three charges was continued for 15 minutes. Then 0.2 part of resorcinol was added to charge C, and the heating at 375° F. of the three charges was continued for a further 15 minutes. After discharge from the digesters, the stocks were washed, dried and refined.

Stock A was a conventional reclaim; stock B was a reclaim made according to U.S. Pat. 2,871,205; and stock C was reclaim made according to the present invention. Each was compounded according to the Rubber Reclaimers Association test recipe as follows: 200 parts of reclaim, 2 parts of stearic acid, 5 parts of zinc oxide, 0.5 part of mercaptobenzothiazole, 0.2 part of diphenyl guanidine, and 3 parts of sulfur.

The compounded stocks were vulcanized for 30 minutes at 287° F., and tested for non-staining properties by the following retained reflectance test. Cured samples 1″ x 4″ x .075″ were dipped in a white, high gloss lacquer and hung to drain for one hour. The lacquered strips were then exposed to the light of two 275-watt sunlamps positioned so that the center of each lamp was 15 inches above the desired center of exposure. The samples were laid radially on a 12-inch diameter table rotating at 2 r.p.m. The entire system was enclosed and vented, using a blower for circulation of air. Test samples were exposed to the lamps for 10 hours, and both unexposed and exposed samples were examined under the test light of a reflectance meter. The percent retained reflectance is obtained by dividing the reading for an exposed sample by that for an unexposed sample. The higher the reading, the better the non-stain properties. The retained reflectance for stocks A, B and C was 60.5%, 67.9% and 76.5%, respectively, showing a 12.2% increase in retained reflectance for reclaim B compared with reclaim A, and a 26.4% increase in retained reflectance for reclaim C compared with reclaim A. Thus, reclaim C was 14.2% better than reclaim B.

EXAMPLE 2

Each of five samples A, B, C, D, and E (100 parts each) of the whole tire fiber-containing vulcanized scrap used in Example 1 was mixed with 38 parts of non-staining rubber-softening oils (terpenes and mineral spirits), 7 parts of non-staining plasticizer (tall oil pitch), 1.2 parts of calcium chloride, and 180 parts of water. The charges were loaded as in Example 1 and heated four hours at a pressure of about 200 pounds per square inch (375° F.). Then 5.4 parts of 37% aqueous formaldehyde was added to each of charges A, B and C, and 9.7 parts of 37% aqueous formaldehyde was added to each of charges D and E, and the heating at 375° F. of the five charges was continued for 30 minutes. Then 0.25 part of resorcinol was added to each of charges B and D and 0.5 part of resorcinol was added to each of charges C and E, and the heating of the five charges was continued for a further 15 minutes. After discharge from the digesters, the stocks were washed, dried and refined.

Stock A was a reclaim made according to U.S. Pat. 2,871,205. Stocks B, C, D and E were reclaims made according to the present invention. The stocks compounded as in Example 1, were vulcanized for 30 minutes at 278° F., and tested for non-staining properties as described in Example 1. The retained reflectance values for stocks A, B, C, D and E were 69%, 74%, 76.5%, 80.2% and 79.3%, respectively, showing a 7 to 15% increase in retained reflectance for reclaims B, C, D and E made according to the present invention over reclaim A made according to U.S. Pat. 2,871,205.

EXAMPLE 3

A series of reclaims was prepared by the procedure used in Example 2, using 5.4% of formaldehyde and various amounts of resorcinol from 0.0125% to 0.25%. These all gave reflectance values in the range from 76.2 to 81.0, compared with 61.2 for the control containing no aldehyde nor resorcinol and 70.8 for the control containing aldehyde but no resorcinol.

EXAMPLE 4

In another series of reclaims made, as in Examples 2 and 3, containing 5.4% of formaldehyde, resorcinol (0.25%) was compared with phloroglucinol (0.29%). The reflectance values were 75 and 76.3, compared with 56 and 70 for the respective controls.

EXAMPLE 5

In another test of reclaims made by the procedure of Examples 2, 3 and 4, as little as 0.00125% of resorcinol gave a vulcanized stock having a reflectance value of 85.1, compared with 68.7 for the control containing neither aldehyde nor resorcinol—a relative improvement of 24%.

EXAMPLE 6

In further tests, the action of formaldehyde was compared with that of various formaldehyde donors and of chloral, all in conjunction with resorcinol.

Portions of digested whole tire intermediate were mixed with water and aldehyde materials, thus:

|  | A | B | C | D | E | F | G |
|---|---|---|---|---|---|---|---|
| Intermediate | 100 | 100 | 100 | 100 | 100 | 100 | 100 |
| Formaldehyde |  | 2 |  | 5.4 |  |  |  |
| Paraformaldehyde |  |  | 2 |  |  |  |  |
| Trimethylolphenol |  |  |  |  | 6.7 |  |  |
| Trimethylolacetaldehyde |  |  |  |  |  | 2 |  |
| Chlora |  |  |  |  |  |  | 9.8 |
| Water | 200 | 200 | 200 | 200 | 200 | 200 | 200 |

These charges were digested in an autoclave, with agitation, for 30 minutes at a pressure of 200 p.s.i. (375° F.). Then 0.25 part of resorcinol was added to each, except A, and the mixes were digested for an other 30 minutes at 200 p.s.i., then washed, dried, and refined. Test mixes were compounded and press-cured (30 min. at 287° F.) as before. Reflectance values were as follows:

A ---------------------------------------- 68, 69
B ---------------------------------------- 85.5
C ---------------------------------------- 86.8
D ---------------------------------------- 86.8
E ---------------------------------------- 88.3
F ---------------------------------------- 84.3
G ---------------------------------------- 87.0

It is seen that the formaldehyde donors and chloral, on an equivalent basis, are equally as effective as formaldehyde.

Equally good results were obtained when the procedure was varied by adding the resorcinol or equivalent material to the batch initially, before commencing the digestion, and adding the formaldehyde at some later time during the digestion. This is shown in Examples 7–10 below.

EXAMPLE 7

A vulcanized tire stock, known to give a staining reclaim, was comminuted to pass a 3/16-inch mesh screen. Three portions (100 parts each) were each mixed with 10 parts of tall oil pitch, 61 parts of softening oils (terpenes and mineral spirits), and 200 parts of water. To one portion, C, was also added 0.28 part of resorcinol. The three mixes were digested for 4 hours at 200 p.s.i. Then 2.2 parts of formaldehyde was added to C and another portion, B, none being added to the third portion, A. Digestion at 200 p.s.i. was continued for 45 minutes, then the three batches were washed, dried, and refined. Test vulcanizates had the following reflectance values:

A ---------------------------------------- 31
B ---------------------------------------- 40.8
C ---------------------------------------- 46.5

It is seen that the stock treated with both resorcinol and formaldehyde is superior.

EXAMPLE 8

Pre-digested whole tire intermediate stock portions were further digested with water and various amounts of resorcinol ranging by decimal logarithmic increments from 0.000025% to 0.25%, for 30 minutes at 200 p.s.i. Then 5.4% of formaldehyde was added to the resorcinol-treated batches and to one similarly digested control portion containing no resorcinol. These batches, along with a similarly digested control having no added chemicals, were further digested for 30 minutes at 200 p.s.i., then washed, dried, and refined. Comparison of compounded and vulcanized samples of each showed that the minimum amount of resorcinol required to give significant improvement in reflectance over that imparted by formaldehyde alone is about 0.002%.

EXAMPLE 9

The procedure of Example 5 was followed, except that the order of addition of the resorcinol and the formaldehyde was reversed: that is, resorcinol (0.0125%) was included in the initial charge; and, after digestion for 4 hours at 200 p.s.i., formaldehyde (5.4%) was added, then digestion was continued for 30 minutes at 200 p.s.i. After compounding and vulcanization, the reflectance value was found to be 87.6, compared with 68.7 for a control containing neither of the added chemicals.

EXAMPLE 10

Products obtained by pre-reacting resorcinol with formaldehyde or acetaldehyde or acetone were found to be just as efficacious as resorcinol itself in improving the reflectance of whole tire reclaim. To portions of whole tire reclaim intermediate (digested but still unmassed) were added, respectively, 0.25% of resorcinol, or 0.31% of one of the indicated resorcinol condensates. (The resorcinol/ formaldehyde condensate contained 20% of unreacted resorcinol.) Each mix was digested in 200% of water for 30 minutes at 200 p.s.i., then 5.4% of formaldehyde was added, and digestion was continued for 30 minutes. The batches were worked up as before, and samples were compounded and vulcanized, along with similar samples which had been treated in the same way with resorcinol or a resorcinol condensate, but had not been treated with formaldehyde.

Reflectance values for the four stocks prepared according to the invention all had reflectance values of 83 to 84, whereas the stocks not treated with formaldehyde had values of about 70.

I claim:

1. The process of reclaiming scrap vulcanized polymer and copolymer rubbers derived from alkadienes which comprises heating the scrap at from 300° to 550° F. in the presence of an aldehyde or aldehyde donor which is formaldehyde, paraformaldehyde, chloral, trimethylolphenol, or trimethylolacetaldehyde, and in the presence of a resorcinol material which is resorcinol, phloroglucinol, resorcinol-formaldehyde condensate, resorcinol-acetaldehyde condensate, or resorcinol-acetone condensate, said aldehyde or aldehyde donor and said resorcinol material being used in amounts of about 0.2 to 10% and of about 0.001 to 2%, respectively, based on the weight of scrap, the amount of available aldehyde present being equal to at least one-half the amount of resorcinol material present on a molar basis.

2. The process of claim 1 wherein the scrap is heated in an autoclave at temperatures in the range from 300° to 420° F. and in the presence of 100 to 300 parts of water per 100 parts of scrap.

3. The process of claim 1 wherein the aldehyde is formaldehyde.

4. The process of claim 1 wherein the resorcinol material is resorcinol.

5. The process of claim 2 wherein the aldehyde is formaldehyde and the resorcinol material is resorcinol.

References Cited

UNITED STATES PATENTS 722,944  3/1903  Chautard et al. _____ 260—714
2,871,205  1/1959  Mankowich et al. _____ 260—2.3

SAMUEL H. BLECH, Primary Examiner

U.S. Cl. X.R.
260—714, 720